Aug. 7, 1962   C. H. HESS ET AL   3,048,228
HITCH DEVICE
Filed May 18, 1960   3 Sheets-Sheet 1

INVENTORS.
CHRISTIAN H. HESS
DAVID C. HORNEY
BY
ATTORNEYS

Aug. 7, 1962  C. H. HESS ET AL  3,048,228
HITCH DEVICE
Filed May 18, 1960  3 Sheets-Sheet 2
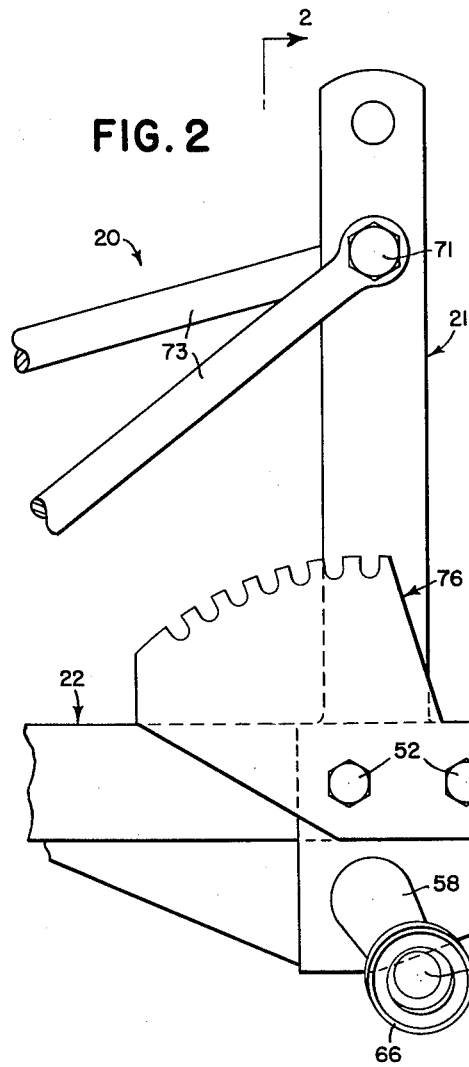
FIG. 2
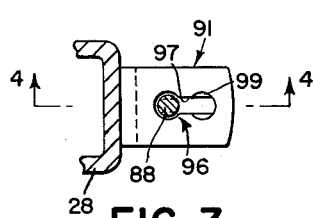
FIG. 3
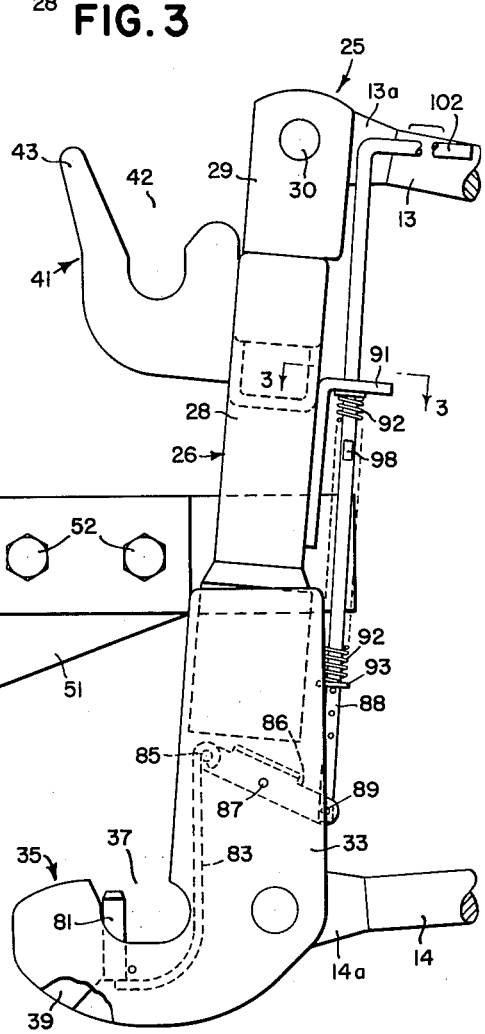
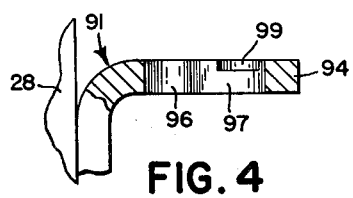
FIG. 4
INVENTORS.
CHRISTIAN H. HESS
DAVID C. HORNEY
BY
ATTORNEYS Aug. 7, 1962 C. H. HESS ET AL 3,048,228
HITCH DEVICE
Filed May 18, 1960 3 Sheets-Sheet 3
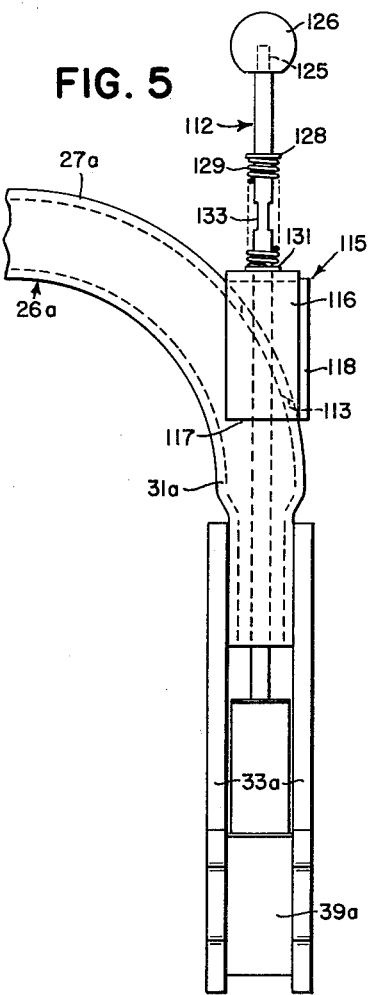
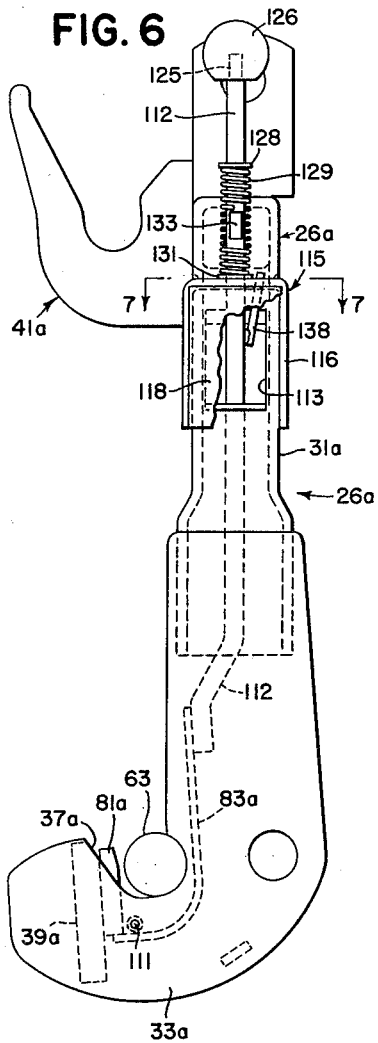
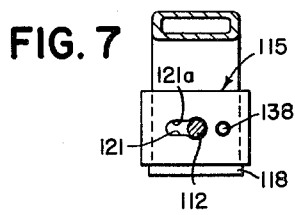
INVENTORS.
CHRISTIAN H. HESS
DAVID C. HORNEY
BY
C. T. Parker & R. C. Johnson
ATTORNEYS

United States Patent Office 3,048,228
Patented Aug. 7, 1962

3,048,228
HITCH DEVICE
Christian H. Hess and David C. Horney, Waterloo, Iowa, assignors to Deere & Company, Moline, Ill., a corporation of Delaware
Filed May 18, 1960, Ser. No. 29,959
7 Claims. (Cl. 172—272)

This application is a continuation-in-part of our co-pending application, Ser. No. 770,754, filed October 30, 1958, for Hitch Device, now abandoned.

The present invention relates generally to agricultural implements and more particularly to tractor mounted implements that are adapted to be connected to tractors having a power operated 3-point hitch, in which the tractor carries upper and lower vertically and laterally swingable hitch links, the rear ends of which are adapted to be connected with any one of a number of different available implements, and in which power means is provided for raising and lowering the links to raise and lower the implement associated therewith.

The object and general nature of this invention is a provision of new and and improved hitch means whereby the connecting and disconnecting of the implement may easily and quickly be accomplished with a minimum expenditure of time and effort while the operator remains on the seat of the tractor. More specifically, it is a feature of this invention to provide means in the form of a coupler frame especially constructed and arranged to be connected to the rear ends of the upper and lower hitch links of the tractor and provided with means engageable with a companion frame carried by and normally forming a part of the implement, the two frames having cooperating means whereby the tractor may be backed into operative relation with the implement and the draft links operated to raise the implement, or at least the front portion thereof. By virtue of this construction the frames are automatically brought into proper alignment and connected in draft-transmitting relation by utilizing the raising and lowering of the draft links of the tractor, without requiring any extraneous power operated ram or the like or any excessive manuvering of the tractor and/or the implement with respect to one another.

A further feature of this invention is the provision of new and improved latch means for locking the coupler frame and the companion implement frame in interconnected and draft-transmitting relation. More specifically, it is another feature of this invention to enclose the latching control linkage within portions of the coupler frame.

These and other objects and advantages of the invention will be apparent to those skilled in the art after a consideration of the following detailed description, taken in conjunction with the accompanying drawings, in which:

FIG. 2 is a side view of the principal portions of an implement-tractor connection incorporating the features of this invention.

FIG. 3 is a sectional view taken generally along the line 3—3 of FIG. 2.

FIG. 4 is a sectional view taken generally along the line 4—4 of FIG. 3.

FIG. 5 is a fragmentary view somewhat similar to FIG. 2, showing a modified form of latching control linkage.

FIG. 6 is an end view of the arrangement shown in FIG. 5.

FIG. 7 is a fragmentary view taken along the line 7—7 of FIG. 6.

FIG. 8 is a side view, diagrammatic in nature, illustrating a farm tractor of the type adapted to receive the hitch means of this invention.

Figure 1:
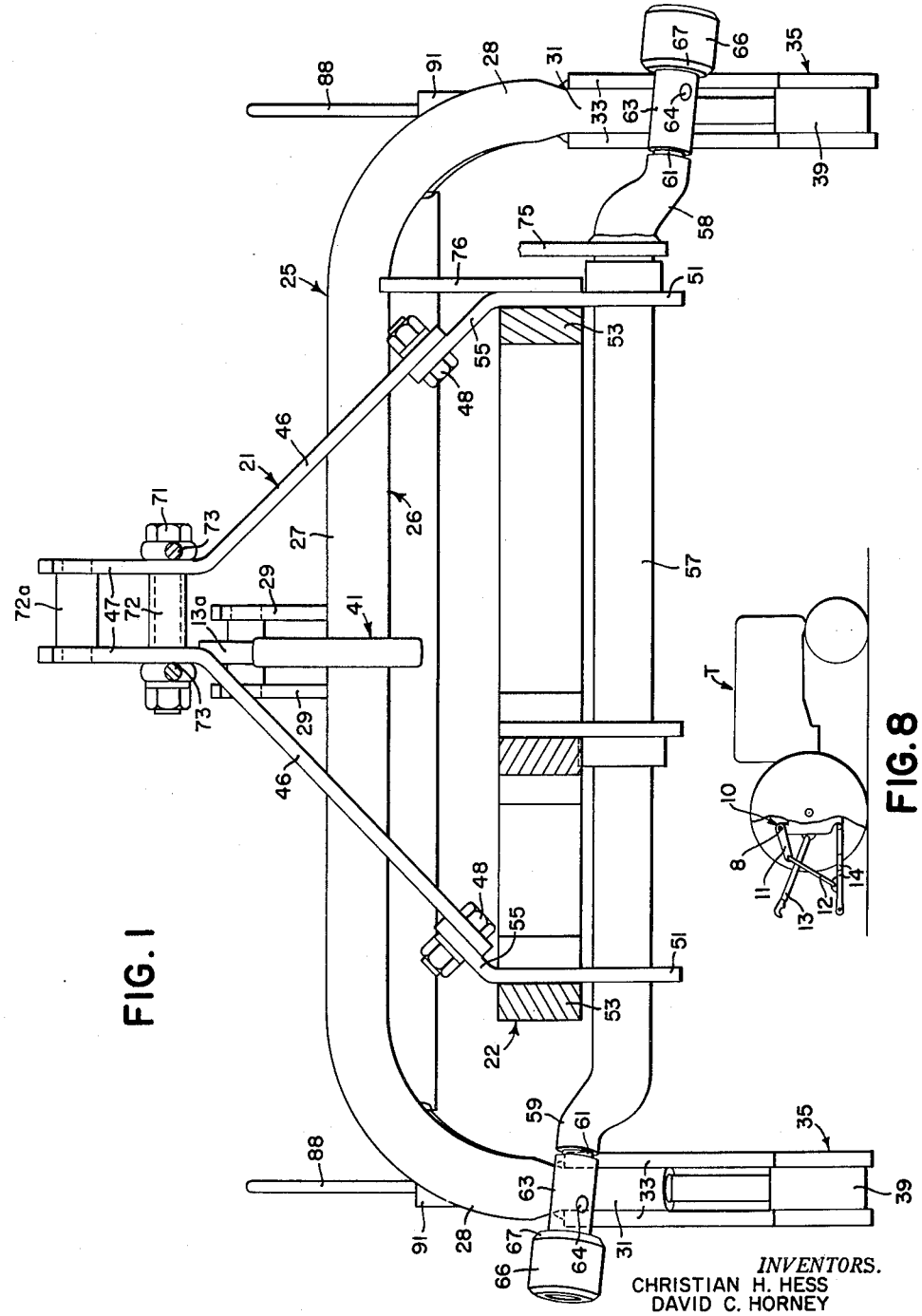
FIG. 1 is a view taken generally along the line 2—2 of FIG. 2.

Referring first to FIG. 1, the tractor with which this invention is particularly adapted to cooperate is of the usual construction and as illustrated in FIG. 8, includes a power lift mechanism 10 carried at the rear portion of the tractor and having a rock shaft 8 carrying a pair of lift arms 11 connected through lift links 12 to raise and lower an upper link 13 and a pair of lower hitch links 14, which constitute the principal portions of the conventional three-point hitch linkage with which many tractors today are equipped. The links 13 and 14 are connected at the forward ends with the rear portions of the tractor T for both vertical and horizontal movement and the rear ends of the links are provided with implement-connecting sections 13a and 14a that are apertured or otherwise formed to receive implements that are to be connected with the tractor.

The implement chosen to illustrate the principles of the present invention is indicated in its entirety by the reference numeral 20 and is per se of conventional construction except as to a transverse vertical hitch frame 21 that is described below in detail. The implement 20 includes a generally fore-and-aft extending conventional plow frame 22 to which a plurality of plow bottoms is connected in the usual way.

The coupler frame, which is of primary concern in the present invention, is indicated in its entirety by the reference numeral 25 and comprises a transverse vertical section made up of a generally inverted U-shaped member 26 that includes an upper transverse section 27 and a pair of depending limbs 28. The coupler also includes a pair of vertical lugs 29 welded to the generally central portion of the member 27 and forming a bracket to receive the rear end of the upper hitch link 13. The bracket lugs 29 are apertured to receive a transverse attaching part 30 to which the coupler end 13a of the link 13 is adapted to be connected.

The member 27 is preferably formed as a square pipe section, and the limbs 28 are flattened, as at 31, to provide means receiving pairs of jaw plates 33 that are secured, as by welding, to the associated flattened portions 31. The lower ends of the jaw plates 33 are formed as hook means 35 that extend generally rearwardly with respect to the vertical transverse plane of the coupler 25. The hook portions 35 present upwardly facing notches 37 (FIG. 2), and as will best be seen in FIG. 1, these notches or sockets 37 lie generally in vertical laterally spaced apart planes. The jaw plates 33 of each pair are interconnected at the hook portions by a reenforcing block 39 that is welded between the hook portions 35.

An upper hook means 41 is fixed to the generally central part of the horizontal portion 27 of the member 26 and includes a rearwardly extending and upwardly facing member having a notch or socket 42 disposed generally in the same vertical transverse plane as the lower notches 37. The hook member 41 has a rearwardly and upwardly extending section 43 that has a particular function in connection with the implement-carried frame 21 that will now be described.

The implement-carried frame 21 is a rigid vertical transversely extending structure in the form of an A-frame and is made up of a pair of laterally spaced apart and upwardly converging bar sections 46 having at the upper ends vertical parallel portions 47. The bar sections 46 are apertured at the lower ends to receive connecting bolts 48 by which the lower portion of the bars 46 are fixed to right and left hand bearing plates 51 that are connected in the usual way, as by bolts 52, to the forward ends of right and left hand plow beams 53, the latter forming a portion of the plow frame 22 mentioned above. The upper portions of the bearing plates 51 are angled upwardly and laterally inwardly as at 55, and are apertured to receive the bolts 48 connecting the lower ends of the angled bar sections 46 to the bearing plates 51.

The lower portions of the bearing plates 51 are apertured to receive a cross shaft 57 that preferably has offset ends 58 and 59, each of which carries a laterally outwardly extending stud 61 that in conventional practice, as when the coupler frame of the present invention is not utilized, may receive the rear ends of the tractor lower draft links 14. According to the principles of this invention, each of the studs 61 carries a hook-receiving member in the form of a sleeve 63 that is apertured to receive a roll pin 64, by which the sleeve 63 may be pinned to the associated stud 61. Fixed to the outer end of each of the sleeves 63 is a hook-retaining member 66 that comprises a part having an inner flaring section 67 that is appreciably larger in diametrical dimension than the sleeve 63 as will be seen from FIG. 1. The upper bar portions 47 are apertured to receive a transverse bolt 71 on which is mounted an attaching member in the form of a transverse sleeve 72. The bolt 71 also forms means attaching a pair of brace rods 73 to the implement-carried frame 21, the brace rods 73 extending rearwardly and connected in any suitable way to the plow frame 22 by means not shown. By virtue of the brace rods 73, the implement frame 21 is rigid with the plow frame 22.

A hand lever 75, shown fragmentarily in FIG. 1, is secured, as by welding, to one end of the cross shaft 57, and extends upwardly at one side of the plow 20 generally alongside a sector 76 so constructed and arranged to be attached to and form a part of the plow frame 22 by virtue of receiving the bolts 52 that fix the lower portions of the associated bearing plate 51 to the plow frame. The function of the lever 75 and the associated bar 57 is to level the plow in operation. The upper closely spaced parallel portions 47 of the bars 46 extend upwardly beyond the attaching part 72 and are apertured to receive an attaching part 72a that may be used to receive the rear end of the upper end of the hitch link 13 directly when the coupler frame of the present invention is not used.

For the purpose of retaining the frames in position and locking them in interconnected relation, a vertically shiftable retainer 81 is carried between each pair of jaw plates 33 immediately in front of the associated block 39. These retainers act to fill the gap in the notches 37 and thus lock the associated sleeves 63 therein. Each retainer 81 is in the form of a generally flat block, secured as by welding to a vertically shiftable bar 83 that is disposed between the lower portions of the jaw plates 33 and pivotally connected, as at 85, to a lever 86 that is swingably mounted on a pivot 87 carried by the jaw plates 33. The forward end of each lever 86 is connected to an actuating rod 88 that extends vertically along the associated leg 28, being guided by virtue of the pivotal connection, as at 89, with the lever 87 and by means of an upper bracket 91 through which the rod 88 extends. A spring 92 is disposed about each rod 88 and each spring bears at its upper end against the associated bracket 91 and at its lower end against a vertically adjustable collar 93.

Each bracket 91 has a horizontal leg 94 that is provided with a slot 96, the forward portions of which is narrowed, as at 97, and cooperates with a portion of reduced diameter, indicated at 98, formed in the generally intermediate portion of each rod 88. The narrowed slot has a socket 99 formed in the forward portion, so that when the rod 88 is raised to its upper position, which lowers the associated retainer block 81, the upper handle section 102 of the rod may be used to shift the upper portion of the rod 88 forwardly into the socket 99, which thus retains the associated locking block 81 in stud-releasing position. Each of the rods 88 is raised for disconnecting the implement and held in its socket 99 so that the blocks 81 cannot return to the locked position before the uncoupling of the implement is completed. Before backing into the implement for hooking up, each of the rods 88 is lifted from the socket and when the coupler frame is raised into the implement the weight of the implement acting through the sleeves 63 pushes blocks 81 out of the notches sufficiently until each sleeve is seated in its socket 37. The springs 92 force the blocks into locked position to complete the implement hook-up without further manual effort.

As will be seen from FIG. 1, the mast or hitch frame 21 is slightly offset toward the right relative to the bar 57. This is necessary where the implement 20 is a plow so as to compensate for the tilting of the tractor when plowing with the right hand rear tractor wheel running along the bottom of the previously formed furrow. The distance between the mast sections 47 is greater than the width of the hook 41 so as to provide sufficient clearance for tilting of the tractor and coupler frame relative to the plow.

The operation of the device of this invention as described above is substantially as follows.

The coupler 25 is, according to this invention, attached to the tractor links 13 and 14 and is adapted to be raised and lowered, as desired, by operation of the conventional tractor-actuated power lift. When an implement 20 is to be hitched to the tractor, the latter is backed with the coupler 25 in a lowered position so that as the coupler approaches the implement hitch frame 21, the upper hook portion 43 passes in between the upwardly converging portions 46 of the implement hitch frame 21. In this position of the coupler 25, the lower hook portions 35 are adapted to pass below the associated lower attaching parts 63 but adjacent thereto. The rear edges of the leg portions 31 lie immediately ahead of the sleeves 63. The coupler 25 is then raised, elevating the hook member 41, and if the frames 21 and 25 should not be in exact alignment, the hook member 41 engages one or the other of the upwardly converging frame bars 46, whereby the two frames are then guided into proper alignment as the upper hook socket or notch 42 approaches the attaching part 72. During this action, the upwardly extending portion 43 of the hook member 41 lies rearwardly of the attaching part 72 and may serve as means acting, when the coupler 25 is being raised, to actually lift the front portion of the implement to a certain extent, thus facilitating bringing the frames 21 and 25 into the proper relative position, one with respect to the other. Also, as the frame 25 is raised relative to the implement frame 21 the sleeve portions 63 slide downwardly along the rear edges of the frame leg sections 31 until the sleeves 63 enter the upwardly facing lower latches or sockets 37.

Thus, the upper and lower attaching parts 72 and 63, when seated in the notches 42 and 37, effectively connect the implement to the tractor without requiring that the operator dismount from the tractor to effect the desired connection, and the implement is readily swingable both laterally and vertically relative to the tractor according to the action provided by the conventional three-point hitch links 13 and 14.

Referring now more particularly to FIGS. 6 and 7, the form of this invention shown in these figures is substantially similar to that described above except that the latch controlling linkage is disposed within and enclosed by the leg portions 31a of the U-shaped coupler frame member 27a. As best shown in FIG. 5, the lower ends of the jaw plates 33a are shaped so as to form generally upwardly facing notches 37a, and the forward portions of the jaw plates 33a are rigidly interconnected by being welded to a generally vertical block 39a, the upper portion of which is disposed immediately forward of the associated notch 37a. The coupler frame 27a carries an upper hook means 41a that serves the same purpose as the upper hook means 41 described above.

The hitch sleeves 63 of the associated implement-carried frame 21 are adapted to be releasably held in the notches 37a by means quite similar to that described above in connection with FIG. 2. Vertically movable relative to and disposed immediately in front of the blocks 39a are retainers 81a, substantially like the retainers 81 described above. The jaw plates 33a at each side of the coupler frame carry a roll pin 111 disposed immediately in front of each retainer block 81a. Each block 81a is secured, as by welding, to a vertically shiftable bar 83a, the lower end of which is bent so as to extend rearwardly underneath the associated notch 37a and the upper end of which is secured, as by welding, to a vertically shiftable rod 112 that lies between the upper portions of the jaw plates 33a and extends upwardly within the leg portions 31a of the U-shaped coupler frame member 26a. Generally, at the curved juncture between the horizontal portion of the member 26a and each vertically disposed leg portion 31a there is an opening 113 through which the upper portion of the rod 112 extends. Secured to the member 26a and enclosing the apertured portion at each side of the coupler frame is a bracket 115 that includes a generally U-shaped strap 116 having its side portions welded, as at 117, to the associated leg 31a, and an outer side plate 118 completing the bracket. The latch rod 112 extends outwardly and upwardly of the bracket 115 through a keyhole slot opening 121 (FIG. 7).

The upper end of the latch rod 112 carries a reduced portion 125 on which a ball or knob 126 is fixed. Below the knob 126 the rod 112 is formed to receive an abutment ring 128 against which the upper end of the spring 129 bears. The lower end of the spring 129 bears against a washer 131 that overlies the keyhole slot 121. The latch rod 112 is shaped to form a narrowed portion 133 that is adapted to be slipped into the narrowed portion 121a of the slot 121 when the latch rod is depressed against the spring 129 to move the detent portion 81a downwardly to accommodate disconnection from the implement.

An indicator 138 is provided and is located so as to afford the operator an indication that each latch rod 112 and the locking detent 81a are in an upper position locking the associated implement sleeve 63 in the notch 37a. In this respect, the latch means shown in FIGS. 5–7 operates in substantially the same way as the latch means shown in FIG. 2, except that in the form shown in FIGS. 5–7, the latch mechanism is substantially entirely enclosed and has no projecting parts or exposed parts.

In operation, whenever it is desired to release the implement, the operator pushes downwardly on first one knob 126 until the narrow portion 133 of the rod can be moved into the narrowed portion 121a of the keyhole slot 121, which then holds the associated latch detent 81a in a releasing position, and then the operator lowers or moves the other latch rod 112 downwardly at the other side, after which the coupler frame may be lowered away from the implement attaching frame and the tractor driven away from the implement.

While we have shown and described above the preferred structure in which the principles of the present invention have been incorporated, it is to be understood that our invention is not to be limited to the particular details, shown and described above, but that, in fact, widely different means may be employed in the practice of the broader aspects of our invention.

What we claim, therefore, and desire to secure by Letters Patent is:

1. In a hitch device for connecting an implement to a tractor that includes power operated elevatable lifting means, the combination of a pair of frames, one attachable to said lifting means and the other to the implement, each of said frames including a vertical transverse frame means and said other frame including laterally and upwardly converging side portions and said one frame including an upwardly facing generally rearwardly extending hook on the upper portion of said one frame and adapted to be passed rearwardly, as by backing the tractor, into position between said laterally spaced apart converging portions, whereby, when said litfing means is raised, said converging portions and said hook means act together to shift one or the other of said frames into proper position laterally as a result of said lifting motion, a pair of upwardly facing lower hook means on the lower portion of said one frame, a pair of laterally outwardly extending parts on the lower portion of said other frame and adapted to be engaged by said lower hook means when the frame connected with the lifting means is elevated, and locking means carried by said one frame for holding said lower parts in said lower hook means, whereby said frames are retained in interlocked relation.

2. A hitch device adapted to connect a tractor, having upper and lower hitch links and power lift means connected to raise and lower said links, with an implement having upper and lower connection means, said hitch device comprising a coupler frame having at the forward side thereof means to pivotally receive said upper and lower hitch links, a generally rearwardly extending upwardly facing hook at the rear side of said coupler frame adapted to engage the upper implement connection means, said hook having an upwardly facing socket and an extension extending upwardly and rearwardly from the rear portion of said socket, a pair of laterally spaced rearwardly extending upwardly facing lower hooks on said coupler frame, said lower hooks adapted to engage the lower implement connection means, rearwardly facing sections on the coupler frame immediately above said lower hooks, the generally vertical spacing between said upwardly facing hook and said lower hooks being such that, when said upper hook extension initially engages the upper implement connection and starts to raise the latter said rearwardly facing sections to receive the lower implement connection means, raising the coupler frame with the lower hooks in said position serving to engage said extension on the first mentioned hook with the upper implement connection means and the reaction of said last mentioned engagement causing said lower implement connection means to move downwardly along said rearwardly facing sections and into said lower hooks, and means to lock said lower implement connection means in said lower hooks so as to lock the coupler to the implement, said locking means comprising a pair of generally vertically shiftable parts carried by said pair of lower hooks, upwardly extending members carried by the coupler frame at each side thereof and connected at their lower ends to said vertically shiftable parts, spring means connected with said upwardly extending members to urge said shiftable parts into locking position in said lower hooks, the upper end portion of each of said upwardly extending members carrying means engageable with a portion of said coupler frame to lock said shiftable parts in implement-releasing position.

3. In hitch mechanism adapted to connect a tractor having upper and lower hitch links and power lift means connected to raise and lower said links with an implement having upper and lower connection means, said lower connection means comprising laterally outwardly extending studs, the improvement comprising a coupler frame having a generally inverted U-shaped member formed with an upper transverse section and a pair of depending legs, portions of which are hollow, upper and lower means adapted to receive the rear ends of said upper and lower hitch links fixed to the rearward side of said coupler frame, the lower portions of said coupler frame legs carrying pairs of laterally spaced plates forming studs-receiving hook sections, an upper hook section on the upper transverse coupler frame section, a retainer block disposed between each pair of spaced plates and shiftable therein to lock a stud in the associated stud-receiving section, a rod member connected at its lower portion to each retainer block and extending upwardly through the associated hollow leg portion to a point exterior thereof at the upper portion of the coupler frame, and interlocking means on the upper portion of said coupler frame and the upper portion of each rod member for locking the latter and the associated retainer block in selected position between the associated plates.

4. The invention set forth in claim 3, further characterized by a reinforcing block fixed between the plates of each of said pairs of plates and the latter having stud-receiving notches immediately forward of the associated reinforcing block, the associated retainer block being disposable between the reinforcing block and the associated stud for locking the latter in the associated notch.

5. The invention set forth in claim 3, further characterized by an apertured bracket fixed to the upper portion of the coupler frame at each side thereof, the aperture being in the nature of a keyhole slot, each rod member extending outwardly through the associated keyhole slot, abutment means carried by each rod member above said bracket, spring means encircling each rod member and confined between the associated abutment means and bracket, and narrowed portions on each rod member adapted to interlock with the associated keyhole slot.

6. A hitch device adapted to connect a tractor having upper and lower hitch links and power lift means connected to raise and lower said links with an implement having upper and lower connection means, said hitch device comprising a generally inverted U-shaped coupler frame having an upper transverse portion and downwardly extending laterally spaced apart side members, generally upwardly facing hook sections extending rearwardly from the lower end portions of said side members, each hook section formed with a pair of laterally spaced apart vertically extending plates, an upwardly and rearwardly extending hook member fixed to the rearward side of the generally central portion of said transverse frame portion, said upper implement connection means including a generally centrally disposed transverse member adapted to receive said hook member when said coupler frame is raised with the hook member engaged behind said transverse member, said lower implement connection means comprising a pair of laterally outwardly extending stud means disposable in said hook sections, the latter having recessed portions, and latch means movable along the forward portion of said side members and including retainer means between said vertically extending plates for holding said stud means in said recessed portions of said hook sections.

7. A hitch device for connecting an implement to a tractor having an upper hitch link and a pair of laterally spaced apart lower hitch links, said links being attached for universal movement relative to the tractor and the latter having power operated means for raising and lowering the lower hitch links, said hitch device comprising a vertical A-frame attachable to the forward portion of the implement and carrying lower laterally outwardly extending attaching studs and an upper generally centrally disposed attaching part, portions of said A-frame below said part being laterally spaced apart and converging upwardly toward and leading to said part, and a coupler frame comprising side members including lower spaced apart plates forming upwardly facing hook sections adapted to receive said attaching studs and a rearwardly and upwardly extending part adapted to engage said upwardly converging A-frame portions when the hitch links are raised, latch means insertable in said hook sections to lock said studs therein, and operating means for said latch means comprising a pair of vertical parts connected at their lower ends with the associated latch means and extending upwardly alongside the front portions of said side members.

References Cited in the file of this patent

UNITED STATES PATENTS

| | | |
|---|---|---|
| 2,562,486 | Denning | July 31, 1951 |
| 2,685,453 | Kuhary et al. | Aug. 3, 1954 |
| 2,691,932 | Sawyer et al. | Oct. 19, 1954 |
| 2,743,117 | Hutchings | Apr. 24, 1956 |
| 2,878,598 | Pilch | Mar. 24, 1959 |

FOREIGN PATENTS

| | | |
|---|---|---|
| 532,686 | Canada | Nov. 6, 1956 |
| 62,317 | Denmark | June 6, 1944 |
| 1,007,599 | France | Feb. 6, 1952 |
| 1,014,471 | France | Feb. 17, 1954 |
| | Addition to 59,731 | |